(12) United States Patent
Hu

(10) Patent No.: US 7,800,657 B2
(45) Date of Patent: Sep. 21, 2010

(54) METHOD, APPARATUS AND SYSTEM USING HIERARCHICAL HISTOGRAM FOR AUTOMATIC EXPOSURE ADJUSTMENT OF AN IMAGE

(75) Inventor: Shane C. Hu, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 818 days.

(21) Appl. No.: 11/647,307

(22) Filed: Dec. 29, 2006

(65) Prior Publication Data
US 2008/0158430 A1    Jul. 3, 2008

(51) Int. Cl.
*H04N 5/235* (2006.01)

(52) U.S. Cl. ............... 348/229.1; 348/364; 348/362

(58) Field of Classification Search .......... None
See application file for complete search history.

(56) References Cited

U.S. PATENT DOCUMENTS

| | | | |
|---|---|---|---|
| 5,799,106 A | 8/1998 | Mooney et al. | |
| 6,687,400 B1 | 2/2004 | Szeliski | |
| 2003/0098914 A1 | 5/2003 | Easwar | |
| 2005/0057666 A1 | 3/2005 | Hu | |
| 2006/0008159 A1 | 1/2006 | Kobayashi | |
| 2006/0044459 A1 | 3/2006 | Kato | |
| 2006/0176467 A1 | 8/2006 | Rafii et al. | |
| 2007/0154089 A1* | 7/2007 | Kao | 382/168 |

OTHER PUBLICATIONS

J. Lubin et al.—"Robust, Content-Dependent, High-Fidelity Watermark for Tracking in Digital Cinema," in *Security and Watermarking of Multimedia Contents V*, Edward J. Delp III, Ping Wah Wong, Editors, Proceedings of SPIE vol. 5020 (2003) 10 pages.

N. McCaffrey "CMOS Active Pixel Sensors with Extended Dynamic Range," Vision Show 2000 Sarnoff Corporation, Mar. 17, 2000, 21 pages.

* cited by examiner

*Primary Examiner*—David L Ometz
*Assistant Examiner*—Angel L Garces-Rivera
(74) *Attorney, Agent, or Firm*—Dickstein Shapiro LLP

(57) ABSTRACT

A method, apparatus and system with a hierarchical histogram generator that generates sub-histograms of differing resolutions. These sub-histograms are used to adjust an image exposure setting.

25 Claims, 15 Drawing Sheets

METHOD, APPARATUS AND SYSTEM USING HIERARCHICAL HISTOGRAM FOR AUTOMATIC EXPOSURE ADJUSTMENT OF AN IMAGE

FIELD OF THE INVENTION

Embodiments of the invention relate generally to automatic adjustment of image exposure using histograms.

BACKGROUND OF THE INVENTION

A complementary metal oxide semiconductor ("CMOS") imager is a low cost imaging device. Typically, a CMOS imager includes a light sensor array composed of pixels. Light from a scene is received by each sensor or pixel in the array. Each pixel outputs an electrical signal that corresponds to the intensity and wavelength of the light received. The electrical output of each pixel in the array may be digitized and then combined to create a digital representation of the scene. CMOS imagers may be used, for example, in cameras, scanners, machine vision systems, vehicle navigation systems, video telephones, computer input devices, surveillance systems, auto focus systems, star trackers, motion detection systems, image stabilization systems and in other imaging systems.

Many CMOS imaging applications require high-resolution reproductions of imaged scenes. In order to maintain an optimal quality and brightness of an image, a CMOS imager must be capable of adjusting both exposure and gain settings for the pixel array to account for varying light conditions. Exposure relates to the time duration for which the array is capturing photons and accumulating induced electrons. Gain relates to the amount of analog amplification or attenuation that a pixel signal of the array undergoes. Amplification refers to a gain that is greater than one; attenuation refers to a gain that is less than one.

By varying the exposure and the gain of the array pixels, optimal images can be obtained from the pixel. For example, for the bright light conditions of a beach on a sunny day, an imaging device might adjust the image exposure to a minimum and the pixel gain to less than or equal to one. Similarly, acquiring an image of a polar bear in a snow storm might also require the image exposure be set to a minimum and the gain to less than or equal to one. On the other hand, in dark conditions such as when trying to capture an image of a deer at night, the image exposure might be adjusted to a maximum and the gain to greater than or equal to one.

One method used in automatic exposure control algorithms in an attempt to determine the best exposure setting for an image is to use a histogram. A histogram, in this case, depicts the number of pixels with the same pixel value for each possible pixel value in an image. For example, FIG. 1A depicts a 5×5 pixel array 101. Each pixel 102 has a digital value based on the scene imaged by the pixel array 101. The digital value of each pixel 102 is 'n' bits meaning that each pixel 102 may have one of $2^n$ digital values. The greater 'n' is, the greater the digital resolution of each pixel 102. An 'n' equal to 1 means that each pixel only has a maximum resolution of $2^1$ values. In other words, in a grayscale pixel where 'n' equals 1, the pixel can only be one of two values, black or white. However, if 'n' is greater than 1, the pixel can be either white, black, or some other shade of gray. The higher 'n' is, the greater the number of shades that may be represented by a pixel. Hence, 'n' defines the digital resolution of a pixel.

An example of a histogram 110 of the pixel values in pixel array 101 is shown in FIG. 1B. In FIG. 1B, 'n' is 8. Thus, histogram 110 has $2^n$, or $2^8$ bins along its horizontal axis, the bin numbers ranging from 0 to 255. Each bin represents a possible digital value for one or more pixels 102 in pixel array 101. The histogram 110 is populated by indicating in each bin the number of pixels 102 from the pixel array 101 having digital values corresponding to each respective bin number.

Once the histogram 110 is populated, the histogram 110 may be analyzed to determine if the image exposure needs adjustment. In general, an optimum exposure setting will result in a histogram with a broad distribution of pixel values across the range of the bins. In contrast, a histogram where the majority of pixel values are in the upper ranges of the histogaram indicates that the image is over-exposed as too many pixels have large output signal values and the exposure time should be reduced, thus creating a broader distribution of pixel values within the histogram. A histogram where the majority of pixel values are in the extreme lower ranges of the histogram indicates that the image is under-exposed and the exposure time should be increased. An example of an algorithm for adjusting the exposure time based on the distribution of pixel values within a histogram is described in U.S. patent application Ser. No. 10/661,551, published as U.S. 2005/0057666, herein incorporated by reference in its entirety.

An automatic exposure adjustment algorithm such as explained in the '551 application may be implemented as an auto-control feedback loop. FIG. 2 is a block diagram of an auto-control feedback loop 200. The pixel array 201 accumulates charge based on an exposure to light from a scene. Exposure registers in a register circuit 210 control the exposure of the pixel array 201. The accumulated charge within each pixel in the pixel array 201 is sent as a digitized image stream 215 from the pixel array 201 to the automatic exposure control circuit 220. The automatic exposure control circuit 220 creates a histogram and evaluates the same and then updates one or more exposure registers in the register circuit 210 via a feedback stream 225. This process may repeat until a desired exposure setting is obtained for array 201.

Returning again to FIG. 1B, histogram 110 is represented as a full histogram, meaning that histogram 110 has a bin for each possible pixel value and each bin has a bin capacity large enough to accumulate a count representing every pixel 102 in pixel array 101. In the example of FIG. 1B, each bin has the capacity to represent all 25 (5×5) pixels 102. In other words, each bin has a bin depth of 5 bits, where $2^5$ is the next greatest power of two greater than 25. In hardware terms, creating a full histogram for the example of FIG. 1B requires 256 5-bit bins or 1,280 registers (256×5 registers). If each register is implemented by 8 gates, the total number of gates required is 10,240 gates. If the example were changed from a 5×5 pixel array to a typical quarter video graphics array ("QVGA") image of 320×240 pixels, then a full histogram with 8-bit pixel values and maximum bin depth would require 256 17-bit bins. In this case, the full histogram would require 4,352 registers or 34,816 gates.

Clearly, generating a full histogram multiple times for each image tested during an automatic exposure operation requires a large amount of hardware resources and processing time. One method for reducing the hardware and processing demands is to not use a full histogram. Instead of generating a bin for each possible digital pixel value (e.g., 'n' equals 8 in the example above), the bin count is alternatively based on, for example, the 'x' most significant bits of a pixel's digital output. If for example, a pixel's digital output was 10 bits long (normally requiring a histogram with $2^{10}$ or 1,024 bins), one could construct a reduced histogram using only the most important 'x' bits of each pixel output, where 'x' might be 6 or 7 (thereby only requiring 64 or 128 bins, respectively). Though the resolution of the resulting exposure measurement and control is thus somewhat reduced, the resulting savings in hardware and processing time is significant.

Another method for reducing the size of storage requirements for the histogram is to reduce the bin depth to only a small percentage of the total possible bin depth. Instead of making each bin capable of representing every single pixel in the pixel array, the bins are only made capable of holding a small percentage of the total number of pixels. For example, using a 90th percentile scheme, a bin need only hold 10% of the total number of pixels. Using a 99th percentile scheme, a bin need only hold 1% of the total number of pixels. In each scheme, a target bin is defined. A 90th percentile target bin represents the bin at which, in the ideal image, 90% of all pixels fall below or, in a histogram, to the left of the target bin and only 10% of all pixels fall in or above (to the right) of the target bin. The number of pixels in each bin is counted and summed, beginning at the highest or right-most bin (the bin that represents the most white pixels). Once the summed bin count equals 10% of the pixels, pixel counting may stop and a determination as to the image exposure setting may be made. If the 10% pixel count is arrived at within a bin that is higher than the target bin, a controller concludes that there are too many pixels in the higher ranges of the histogram and the image is over-exposed; the image exposure setting is adjusted accordingly. Similarly, if the 10% pixel count is arrived at within a bin that is lower than the target bin, the controller concludes that the image is under-exposed and the image exposure setting is adjusted. The goal is to find an image exposure setting that results in 10% of the pixels having values above the defined target bin. A similar scheme may be defined using the 99th percentile, where the focus is only on the highest valued 1% of the pixels.

Because only a small percentage of the pixels are actually counted in either the 90th or the 99th percentile schemes, the histogram bin depths are reduced accordingly. In a 90th percentile scheme, each bin need only have a bin depth of 10% of the total number of pixels. In a QVGA image, each bin need only be capable of storing 10% of the pixels of a 320×240 array. In other words, only 13 bits per bin are necessary ($2^{13}$ is the first power of two greater than 0.10(320×240)). For a 99th percentile scheme, only 10 bits per bin are necessary. With 8 gates per register, a 99th percentile scheme with 'x' equal to 7 requires only 10,240 gates.

In addition to the above-described solutions, greater hardware and processing time savings are still desired.

DETAILED DESCRIPTION OF THE INVENTION

Figure 3:
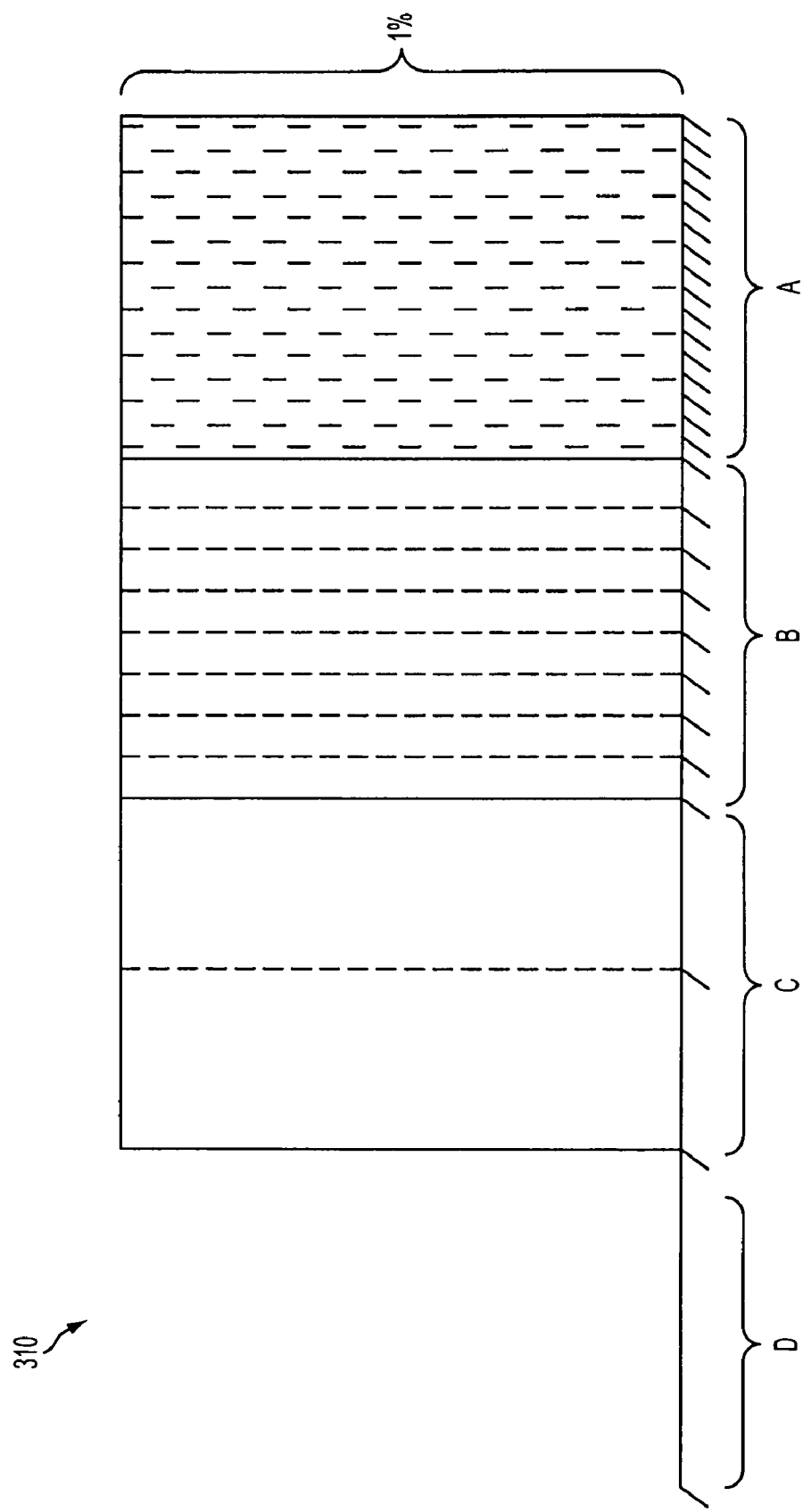
FIG. 3 is a graphic representation of a hierarchical histogram according to an embodiment of the invention.

The disclosed embodiment uses a hierarchical histogram to reduce the amount of storage and processing time required for producing an automatic exposure control signal. A hierarchical histogram 310, as shown in FIG. 3, is composed of multiple sub-histograms A, B, C, D, each with a different number of bins. Sub-histogram A, at the brightest side of the histogram and which includes the highest valued pixels, has the greatest resolution, meaning that sub-histogram A has the highest ratio of the number of bins to the number of possible pixel values. Sub-histogram B, which covers the next highest range of pixel values, is at a somewhat lower resolution, meaning that sub-histogram B has a lower bins to possible pixel value ratio than sub-histogram A. Similarly, sub-histogram C has a lower bins to possible pixel value ratio than sub-histogram B. Sub-histogram D has the lowest bins to possible pixel value ratio. In the illustrated histogram 310, sub-histogram D has zero bins.

Histogram 310 is organized so that the highest valued pixels are included within sub-histogram A, the sub-histogram with the highest resolution. In a high percentile automatic exposure adjustment scheme such as a 90th or 99th percentile scheme, bin counts are counted and summed beginning at the high-value pixel bins, beginning with the bin on the far right of histogram 310. Because only 10% or even 1% of the pixels are counted in the schemes, the ideal image generally results in the target bin count being located towards the upper end of the histogram 310, preferably within sub-histogram A. The image exposure setting is adjusted based on which sub-histogram the target bin count is located within, as discussed below. If the target bin count is located within the highest-resolution sub-histogram A, the image exposure setting may be adjusted most precisely using the resolution of the sub-histogram A. If, however, the target bin count is located in a different sub-histogram, the image exposure setting will be adjusted more coarsely, according to the resolution of the sub-histogram in which the target bin count is located. In a 90th or 99th percentile scheme, the target bin is generally within the highest-resolution sub-histogram A. Thus, bin counts located near the target bin result in a high-resolution fine tuning of the image exposure setting while bin counts located far from the target bin result in a coarser image exposure setting adjustment.

In populating the histogram 310, only the most significant 'x' bits of each pixel need be considered. In the examples which follow, 'x' is equal to seven bits, with individual bits denoted as b[6] to b[0], b[6] being the most significant bit and b[0] being the least significant bit. When 'x' equals seven, the hierarchical histogram may be divided into four sub-histograms. However, the number of sub-histograms in the hierarchical histogram can vary according to the value of 'x.' As is described below, the sub-histograms are organized according to the two most significant bits (b[6] and b[5]) of the pixel values to be stored in the hierarchical histogram.

Sub-histogram A holds pixel values where bits b[6] and b[5] both equal 1. Sub-histogram A has a capacity of $2^5$, or 32 bins for holding pixel values organized by bits b[4] through b[0] of the pixels assigned to sub-histogram A. Thus, for 7-bit resolution, sub-histogram A is at maximum resolution, but only has $2^5$ bins.

Sub-histogram B holds pixel values where bit b[6] equals 1 and bit b[5] equals 0. Sub-histogram B has a capacity of $2^3$, or 8 bins for holding pixel values organized by bits b[4] through b[2] of the pixel values assigned to sub-histogram B.

Sub-histogram C holds pixel values where bit b[6] equals 0 and bit b[5] equals 1. Sub-histogram C has a capacity of $2^1$, or 2 bins for holding pixel values organized by bit b[4] of the pixel values assigned to sub-histogram C.

Sub-histogram D is used for pixel values where bits b[6] and b[5] both equal 0. Sub-histogram D has a capacity of 0 bins for holding pixel values that are less than half the maximum pixel value.

Thus, in the example presented, there are only 42 total number of bins in the histogram compared to a 128 bin histogram for 'x' equal to 7. However the resolution of any exposure adjustment control that is near the target bin (i.e., final adjustment resulting from a target bin count being calculated within sub-histogram A) is $1/128$, a maximum resolution for 7-bit input. In other words, the hierarchical histogram requires less than ⅓ of the storage capacity of a similar non-hierarchical histogram, but still results in the same level of resolution. In hardware terms, the total number of gates required for a 320×240 QVGA image using a 99th percentile scheme is only 3,360 gates (as opposed to 10,240 gates for a non-hierarchical histogram).

Figure 1A:
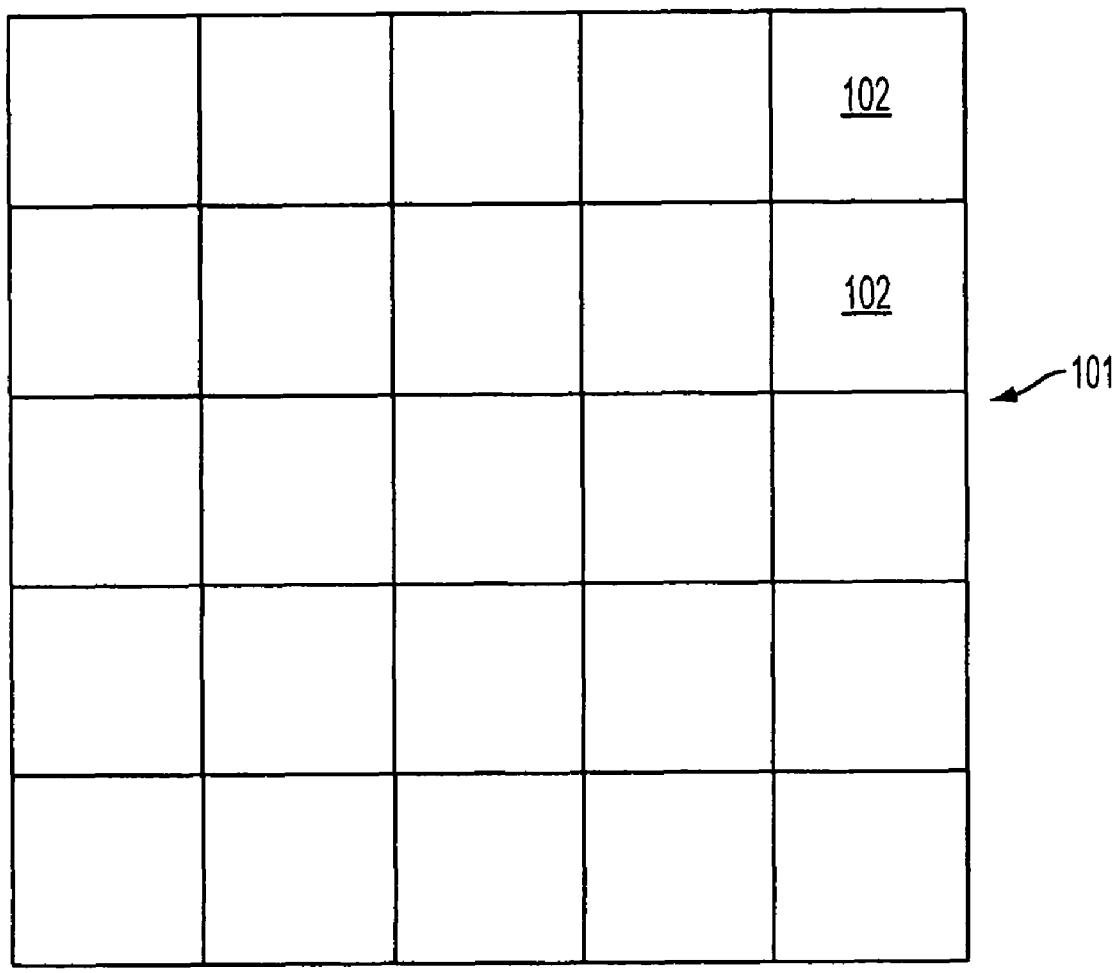
FIGS. 1A and 1B are block diagrams of a pixel array and a graphic representation of a full histogram for the pixel array.
Figure 1B:
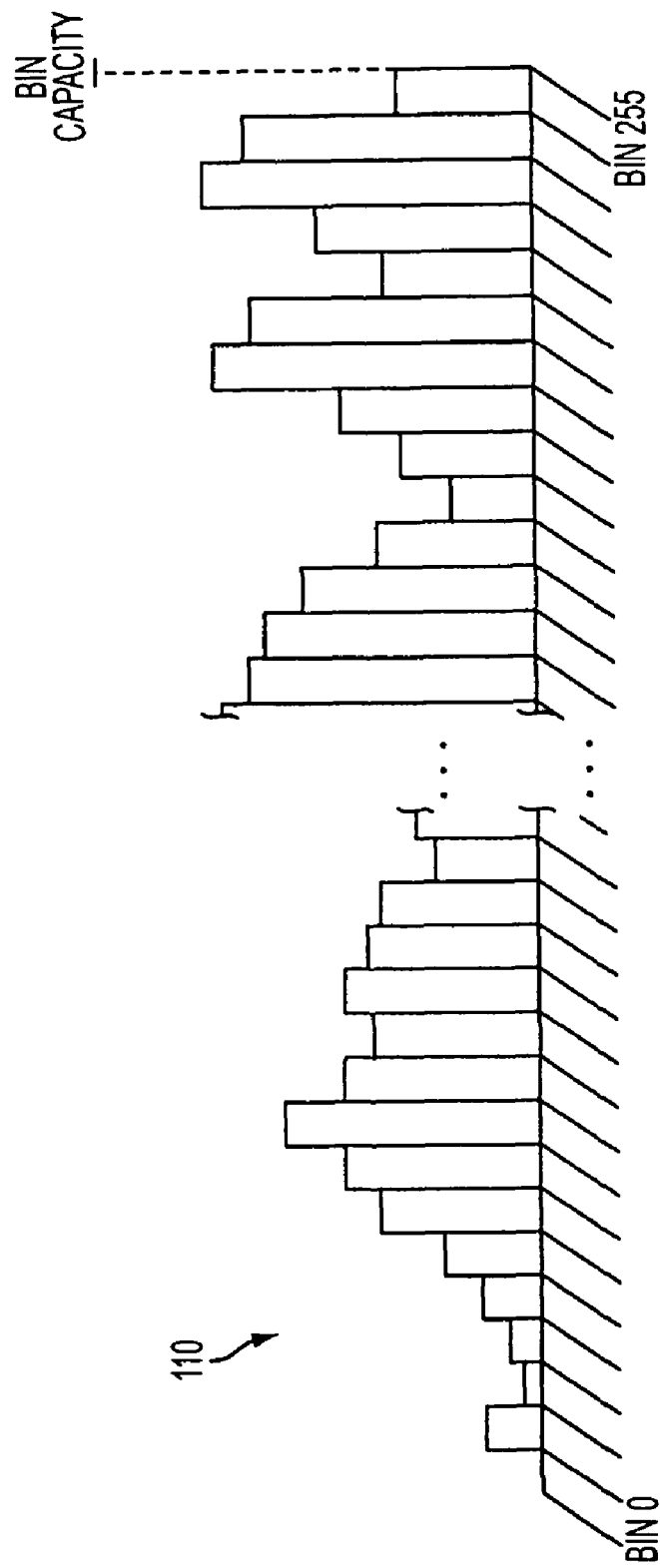
Figure 2:
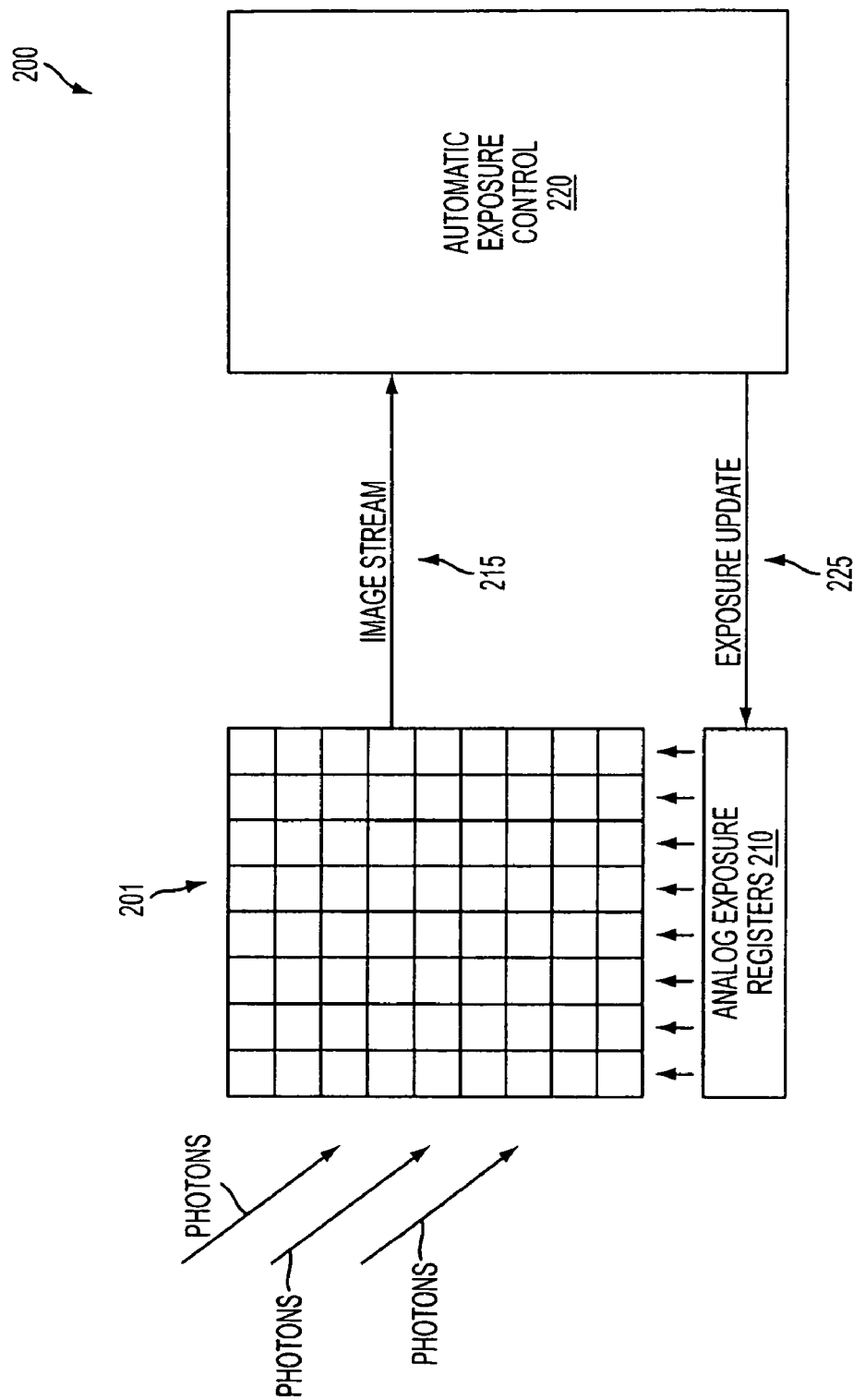
FIG. 2 is a block diagram for an automatic exposure control feedback circuit.

FIGS. 4A-4G are flowcharts illustrating the method 400 of performing automatic exposure control in accordance with an embodiment of the invention. Method 400 is executed upon acquisition of an image by, for example, pixel array 201 in FIG. 2. Method 400 is executed each time an image is acquired in order to determine if the exposure setting used to acquire the image was optimal and, if the setting was not optimal, to adjust the exposure setting for an improved exposure setting during the reacquisition of the image. Method 400 is repeated each time an image is reacquired with a new exposure setting, as explained below.

Figure 4A:
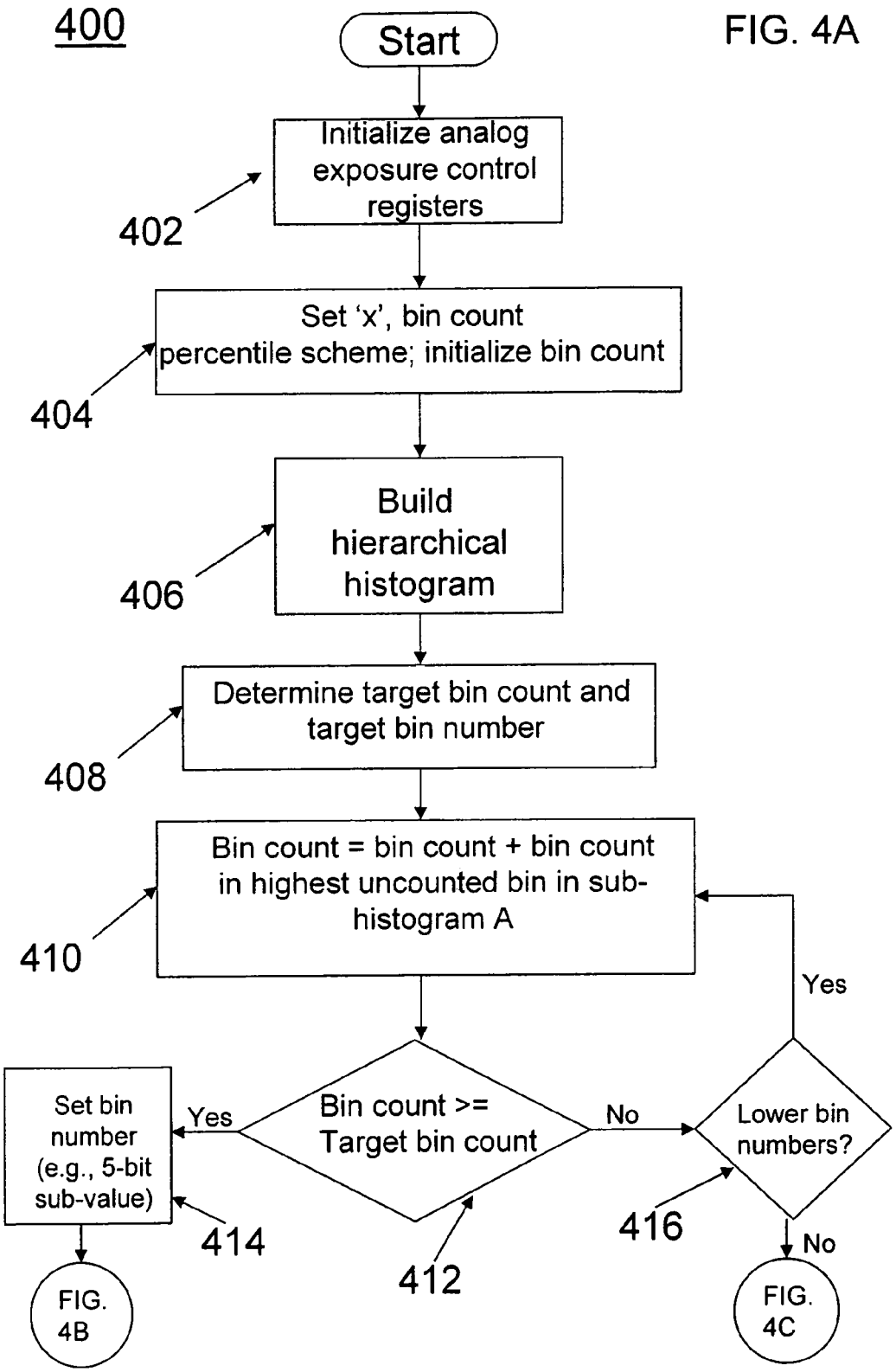
FIGS. 4A-G represent a flow diagram for an automatic exposure control process according to an embodiment of the invention.

In FIG. 4A, the analog exposure control registers (e.g., register circuit 210, FIG. 2) are initialized at step 402. At step 404, the value of 'x' is set, where 'x' refers to the number of most significant bits of each pixel value to be used in the populating of a histogram. Other variables such as the bin count are also initialized at step 404. The bin count percentile scheme is also selected at step 404. For example, a 90th percentile or 99th percentile scheme may be selected. After initialization and setting of the initial variables, the pixel values of an image are used to populate a hierarchical histogram at step 406. The histogram is populated using the 'x' most significant bits of the dynamic range of the pixel values. For example, 'x' could be set equal to 7 for 10-bit pixel values, meaning that the 3 least significant bits of the pixel values are unused. For 'x' equal to 7, the hierarchical histogram explained above, with sub-histograms A, B, C and D, may be used.

At step 408, the target bin count is determined. Using the bin count percentile scheme selected at step 404, the target bin count is set equal to the total number of pixel values multiplied by the appropriate percentage (determined as 100% minus the bin count percentile). For example, in a 320×240 QVGA, and using a 99th percentile scheme, the target bin count is determined as (1.00−0.99)(320×240), or 768. Also, a target bin number is determined. The target bin number is a function of the percentile scheme, 'x' and a desired image appearance as indicated by a user. As explained above, each percentile scheme relates to a different target bin number. A 99th percentile target bin number represents the bin number at which, in the ideal image, 99% of all pixels fall below or to the left of the target bin number and only 1% of all pixels fall in or above (to the right) of the target bin number. A 99th percentile target bin number is necessarily different than a 90th percentile target bin number. The selected number of most significant bits used to populate the histogram, 'x,' will also influence the determination of the target bin number as 'x' relates to the overall number of bins in the histogram. Through experimentation, an optimal target bin number is predetermined for a given percentile scheme and 'x.' The predetermined target bin numbers may be stored in a look-up table which is accessed during step 408. Although the target bin numbers in the look-up table are predefined, a user may further adjust the calculated target bin number according to the user's preferences. For example, through experimentation, a predetermined target bin number for 'x' equal to 7 and a 99th percentile scheme is set equal to 102. However, a user who prefers a more exposed image (perhaps for reasons of enhancing a specific detail in the image or to create a preferred look) may adjust the target bin number from 102 to a higher number (104, for example). In this way, both the target bin count and the target bin number may be dynamically changed within a limited range to facilitate the fine tuning of the exposure control method.

Figure 4B:
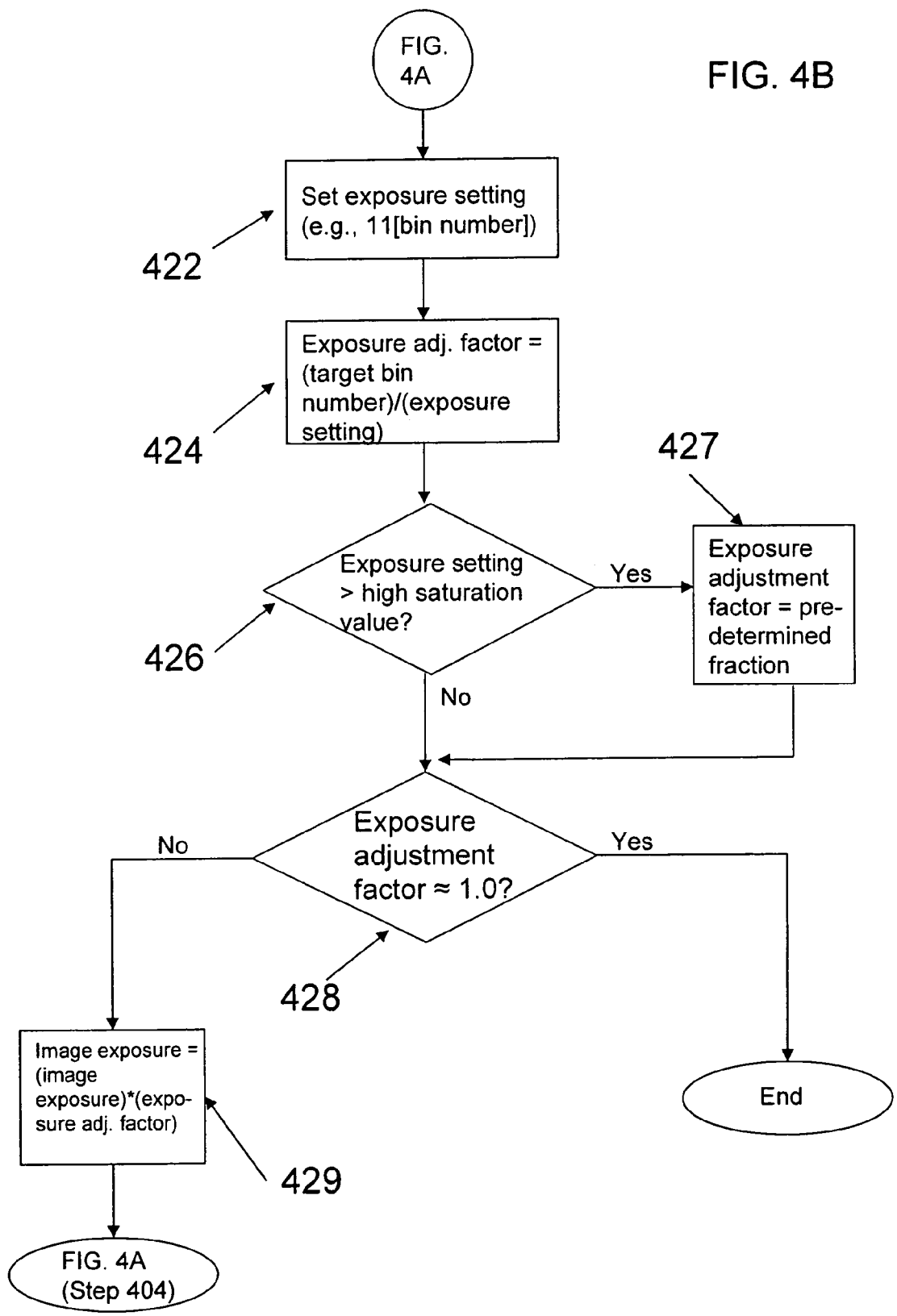

Returning to method 400 and the determination of an optimal exposure setting for the already acquired image, at step 410, the number of pixels represented in the highest bin number of sub-histogram A is determined. The number determined becomes the bin count. At step 412, the bin count is compared with the target bin count. If the bin count is greater than or equal to the target bin count, the bin number is set equal to a sub-value of the x-bit bin number. In the example wherein 'x' is equal to 7 and sub-histograms A, B, C and D are defined as set forth above, the bin number is set equal to the 5-bit sub-value, b[4] to b[0], used to organize the bins within sub-histogram A (step 414). The method 400 proceeds to step 422 (FIG. 4B). If, on the other hand, the bin count is less than the target bin count, the bin count is summed with the number of pixels represented in the next lower bin number (step 410), provided a lower bin number exists (step 416). Once the bin count has been summed, the method 400 returns to step 412 where the bin count is again compared with the target bin count. This process continues until either the bin count is equal to or greater than the target bin count, or the sum of all the bins of sub-histogram A fails to equal or exceed the target bin count. When no lower bin numbers exist and the bin count is still less than the target bin count, the method proceeds to step 430 (FIG. 4C).

With reference to FIG. 4B, an exposure setting is determined at step 422. Continuing the example where 'x' is seven and sub-histograms A, B, C and D have been defined as set forth above, the exposure setting is equal to the concatenation of pixel b[6] and b[5] values (both of which are 1 by definition of the sub-histogram A) with the 5-bit sub-value b[4] to b[0] to form a 7-bit value. At step 424, an exposure adjustment factor is calculated as the target bin number divided by the exposure setting. However, if the image is highly over-saturated (step 426), the exposure adjustment factor is reset to a pre-determined fraction at step 427. If the exposure setting is higher than a pre-determined high saturation value (step 426), the calculated exposure adjustment factor from step 424 is discarded and the exposure adjustment factor is set equal to 0.5, for example (step 427) At step 428, if the exposure adjustment factor is at or near 1.0 (if exact precision is not necessary, a predetermined range of values near 1.0 may be defined in step 404 (FIG. 4A), or, alternatively, a predetermined range of bins within which the bin number should be located may be defined in step 404 (FIG. 4A)), the image exposure setting is optimized and needs no adjustment. If, on the other hand, the exposure adjustment factor is not at or near 1.0, the image exposure setting needs adjustment. If adjustment is necessary, the exposure adjustment factor is multiplied with the image exposure setting to create a new image exposure setting (step 429). Using the new image exposure setting, the image is reacquired and the method 400 continues at step 404 (FIG. 4A) to determine whether the new image exposure setting is optimal.

Figure 4C:
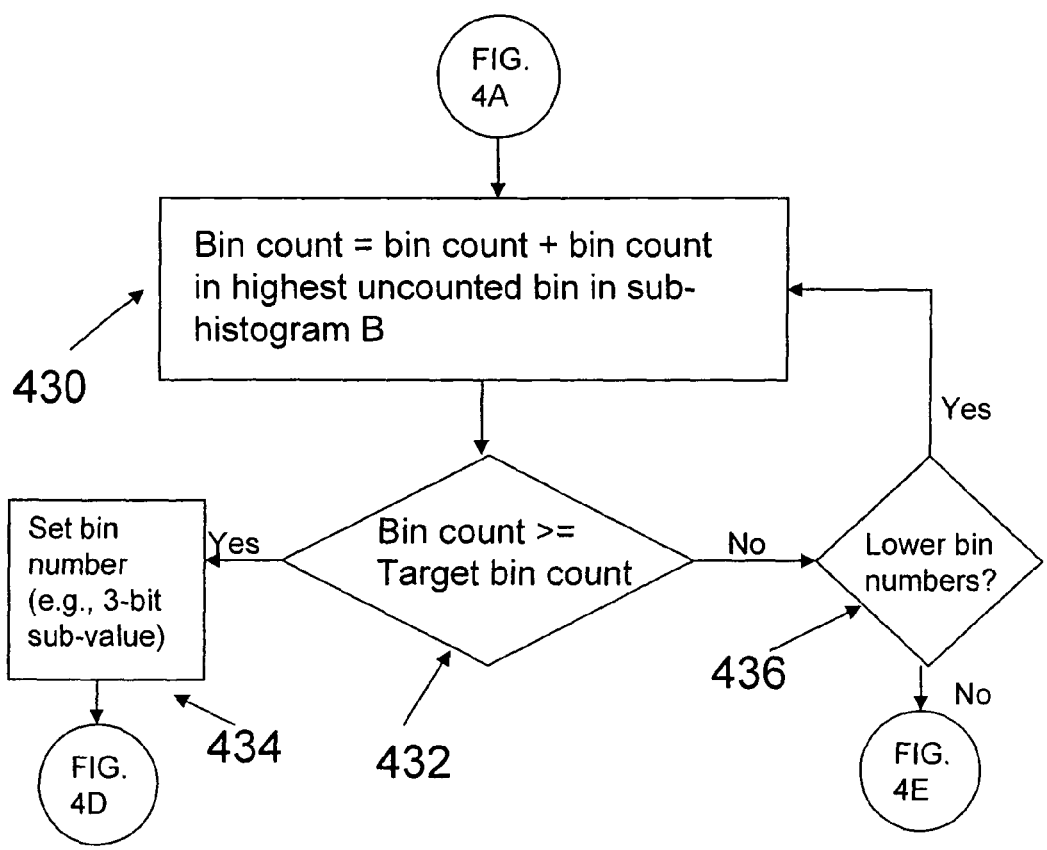
Figure 4D:
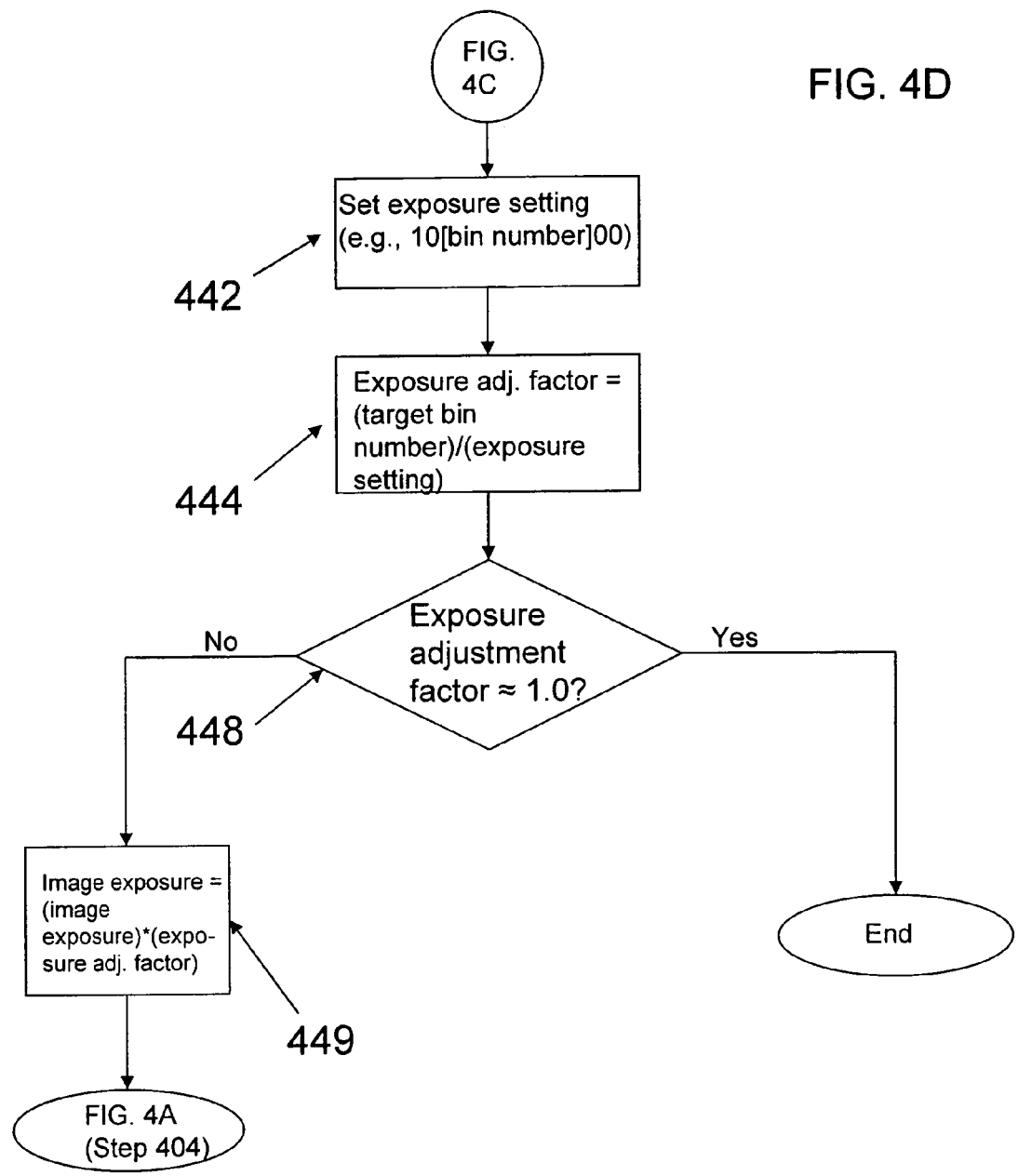

If the result of step 416 (FIG. 4A) is that no lower bin number exists within sub-histogram A and the bin count is still less than the target bin count, the method 400 proceeds to step 430 of FIG. 4C. At step 430, the bin count of the highest bin number in sub-histogram B is added to the bin count already determined in FIG. 4A. At step 432, the bin count is compared with the target bin count. If the bin count is greater than or equal to the target bin count, the bin number is set equal to a sub-value that differs in numbers of bits from the sub-value defined in sub-histogram A. In the above example, the target bin count is set equal to the 3-bit sub-value, b[4] to b[2], used to organize the bins within sub-histogram B (step 434). The method proceeds to step 442 (FIG. 4D). If, on the other hand, the bin count is less than the target bin count, the bin count is summed with the number of pixels represented in the next lower bin number (step 430), provided a lower bin number exists (step 436). Once the bin count has been summed, the method returns to step 432 where the bin count is again compared with the target bin count. This process continues until either the bin count is equal to or greater than the target bin count, or the sum of all the bins of sub-histograms A and B fails to equal or exceed the target bin count. When no lower bin numbers exist and the bin count is still less than the target bin count, the method proceeds to step 450 (FIG. 4E).

In FIG. 4D, an exposure setting is determined at step 442. Continuing the above example, pixels b[6] and b[5] values (1 and 0, respectively, by definition of the sub-histogram B) are concatenated with the 3-bit sub-value b[4] to b[2] to form a 5-bit value. The 5-bit value is then multiplied by four ($2^2$) to form a 7-bit exposure setting. At step 444, an exposure adjustment factor is calculated as the target bin number divided by the exposure setting. At step 448, if the exposure adjustment factor is at or near 1.0 (if exact precision is not necessary, a predetermined range of values near 1.0 may be defined in step 404 (FIG. 4A), or, alternatively, a predetermined range of bins within which the bin number should be located may be defined in step 404 (FIG. 4A)), the image exposure setting is optimized and needs no adjustment. If, on the other hand, the exposure adjustment factor is not at or near 1.0, the image exposure setting needs adjustment. If adjustment is necessary, the exposure adjustment factor is multiplied with the image exposure-setting to create a new image exposure setting (step 449). Using the new image exposure setting, the image is reacquired and the method returns to step 404 of FIG. 4A to determine whether the new image exposure setting is optimal.

Figure 4E:
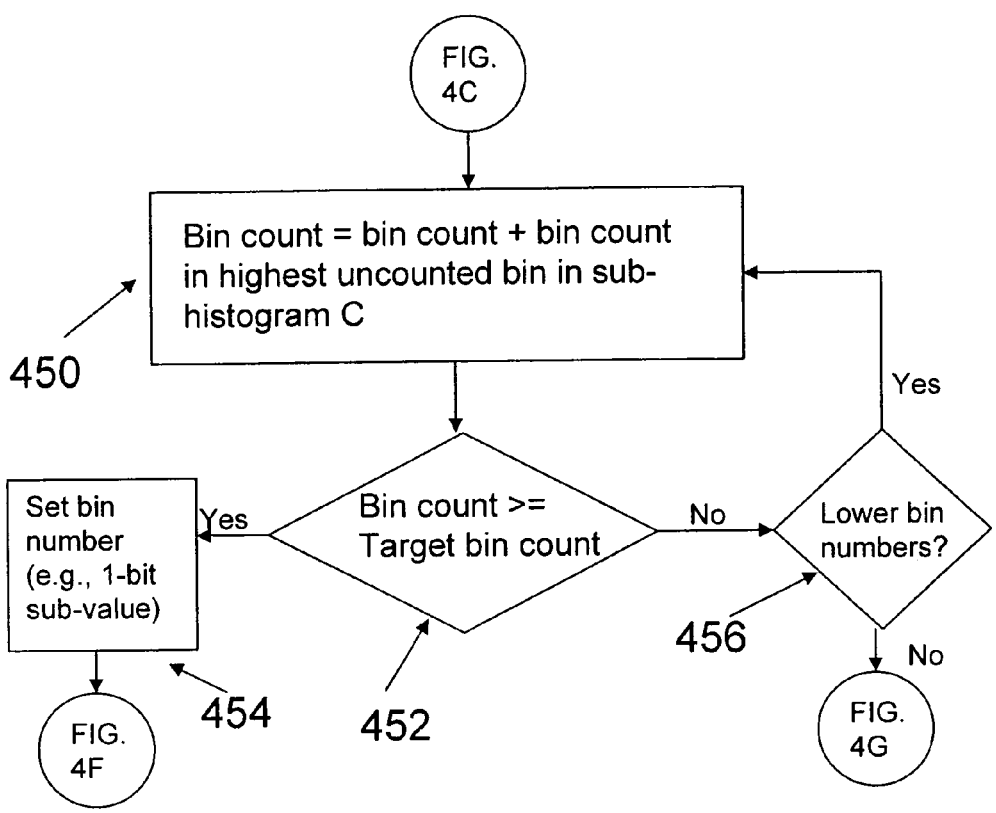
Figure 4F:
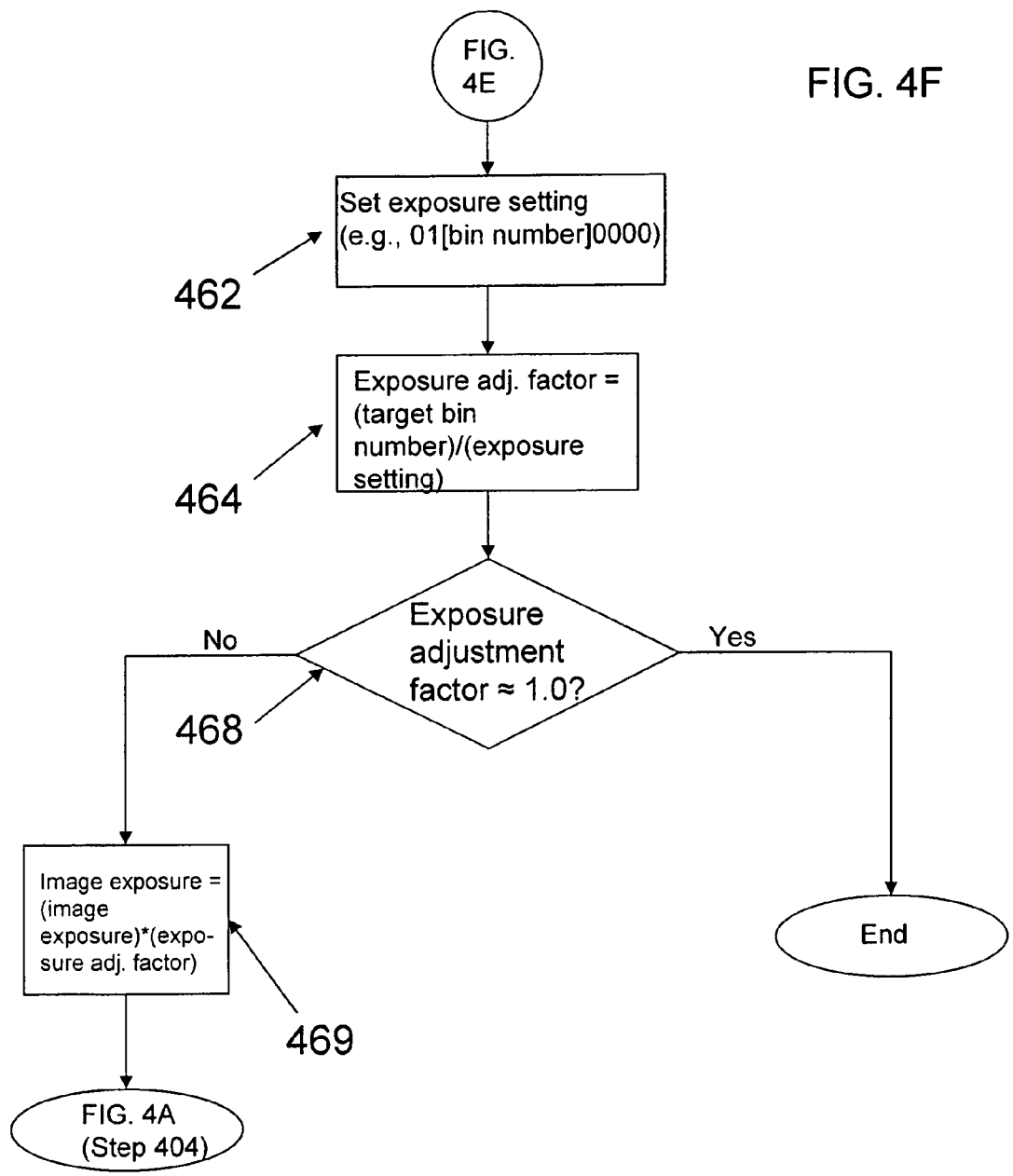

If the result of step 436 (FIG. 4C) is that no lower bin number exists within sub-histogram B and the bin count is still less than the target bin count, the method 400 proceeds to step 450 of FIG. 4E. At step 450, the bin count of the highest bin number in sub-histogram C is added to the bin count already determined in FIG. 4C. At step 452, the bin count is compared with the target bin count. If the bin count is greater than or equal to the target bin count, the bin number is set equal to a sub-value that has a different number of bits than at least one of the sub-values defined for sub-histograms A and B. In the above example, the target bin count is set equal to the 1-bit sub-value, b[4], used to organize the bins within sub-histogram C (step 454). The method 400 proceeds to step 462 (FIG. 4F). If, on the other hand, the bin count is less than the target bin count, the bin count is summed with the number of pixels represented in the next lower bin number (step 450), provided a lower bin number exists (step 456). Once the bin count has been summed, the method returns to step 452 where the bin count is again compared with the target bin count. This process continues until either the bin count is equal to or greater than the target bin count, or the sum of all the bins of sub-histograms A, B and C fails to equal or exceed the target bin count. When no lower bin numbers exist and the bin count is still less than the target bin count, the method proceeds to step 474 (FIG. 4G).

In FIG. 4F, an x-bit exposure setting is determined at step 462. Where 'x' equals seven and sub-histograms A, B, C and D are defined as set forth above, pixels b[6] and b[5] values (0 and 1, respectively, by definition of the sub-histogram C) are concatenated with the 1-bit sub-value b[4] to form a 3-bit value. The 3-bit value is then multiplied by sixteen ($2^4$) to form a 7-bit exposure setting. At step 464, an exposure adjustment factor is calculated as the target bin number divided by the exposure setting. At step 468, if the exposure adjustment factor is at or near 1.0 (if exact precision is not necessary, a predetermined range of values near 1.0 may be defined in step 404 (FIG. 4A), or, alternatively, a predetermined range of bins within which the bin number should be located may be defined in step 404 (FIG. 4A)), the image exposure setting is optimized and needs no adjustment. If, on the other hand, the exposure adjustment factor is not at or near 1.0, the image exposure setting needs adjustment. If adjustment is necessary, the exposure adjustment factor is multiplied with the image exposure setting to create a new image exposure setting (step 469). Using the new image exposure setting, the image is reacquired and the method 400 returns to step 404 (FIG. 4A) to determine whether the new image exposure setting is optimal.

Figure 4G:
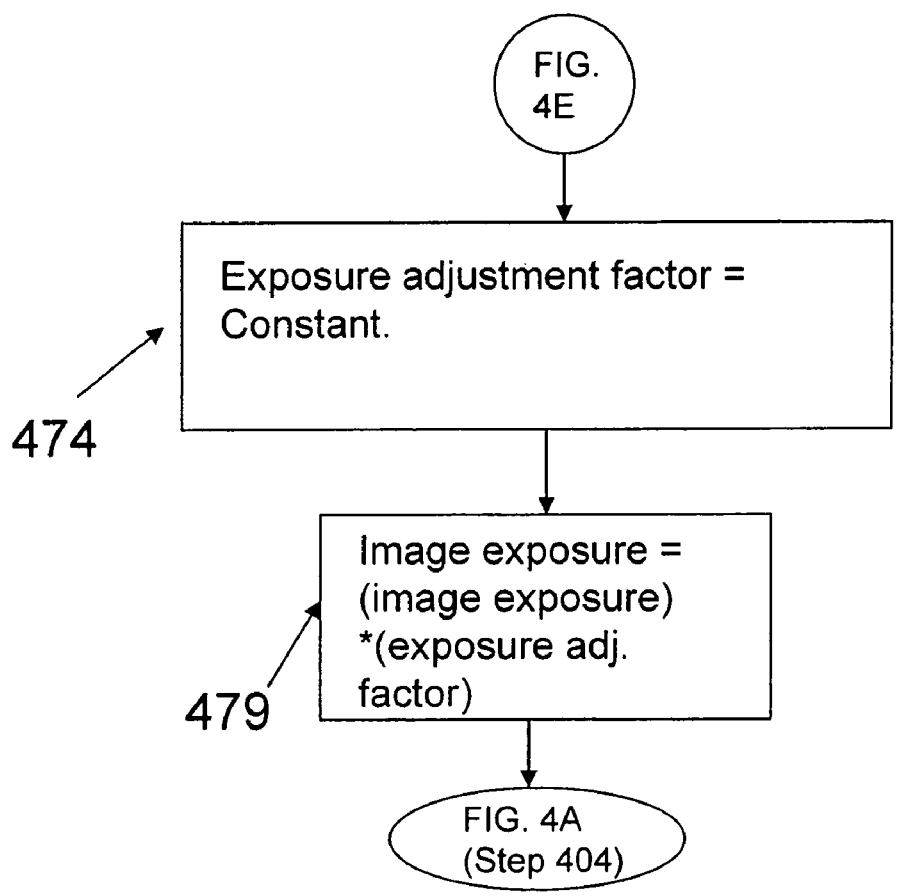

If the result of step 456 (FIG. 4E) is that no lower bin number exists within sub-histogram C and the bin count is still less than the target bin count, the method 400 proceeds to step 474 (FIG. 4G). At step 474, the exposure adjustment factor is set to a constant greater than 1.0. At step 474, the image is presumed to be under-exposed. As a result, the exposure adjustment factor is set to equal, for example, 4.0. Then, at step 479, the image exposure setting is adjusted. The exposure adjustment factor is multiplied with the image exposure setting to create a new image exposure setting. Using the new image exposure setting, the image is reacquired and the method returns to step 404 (FIG. 4A) to determine whether the new image exposure setting is optimal.

Method 400 is described above in both general terms and in the context of a specific example where 'x' is set equal to seven and sub-histograms A, B, C and D are defined as set forth above. Method 400 is not limited, however, to the given example. Method 400 may be used to implement automatic exposure control where 'x' is any integer value and sub-histograms A, B, C and D are defined according to 'x.' The number of sub-histograms is not limited to four; additional or fewer sub-histograms may be used. As shown in FIG. 3, sub-histograms will vary in resolution with other sub-histograms. As shown in FIG. 4, sub-histograms with higher resolutions will result in higher resolution exposure settings.

Figure 5:
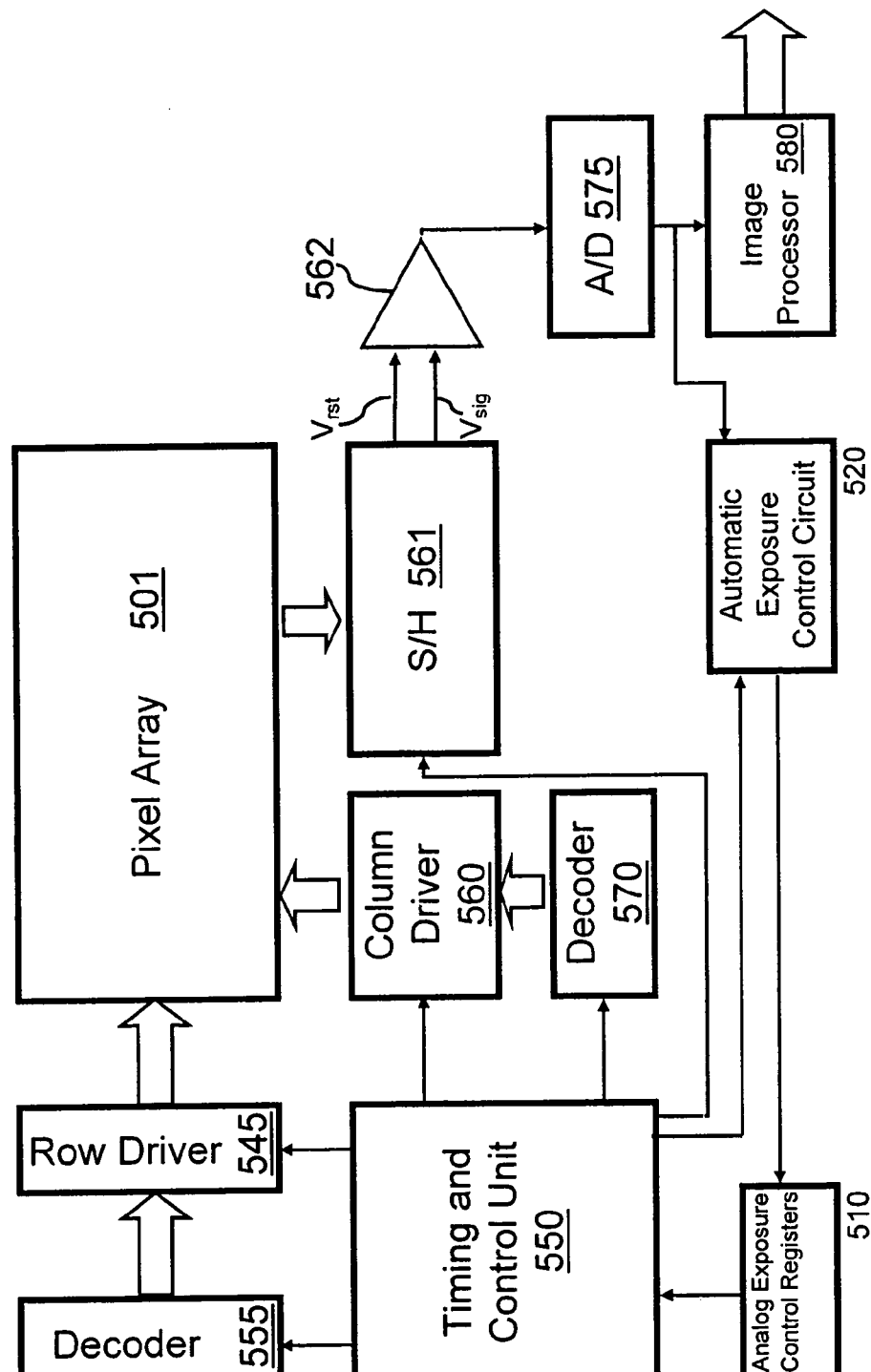
FIG. 5 is a block diagram of a semiconductor imager according to an embodiment of the invention.

FIG. 5 is a block diagram of an example embodiment of an automatic exposure control circuit 520 implemented within, for example, a semiconductor imager 500. Although FIG. 5 depicts a CMOS array and readout circuit as an example semiconductor imager 500, the embodiment described is not limited to use with a CMOS imager, but may be used with any imaging apparatus which generates pixel output values from a pixel array. In FIG. 5, the imager 500 has a pixel array 501 comprising a plurality of pixel cells arranged in a predetermined number of columns and rows. Each pixel cell is configured to receive incident photons and to convert the incident photons into electrical signals. Pixel cells of pixel array 501 are output row-by-row as activated by a row driver 545 in response to a row address decoder 555. Column driver 560 and column address decoder 570 are also used to selectively activate individual pixel columns. A timing and control circuit 550 controls address decoders 555, 570 for selecting the appropriate row and column lines for pixel readout. The control circuit 550 also controls the row and column driver circuitry 545, 560 such that driving voltages may be applied. Each pixel cell generally outputs both a pixel reset signal $V_{rst}$ and a pixel image signal $V_{sig}$, which are read by a sample and hold circuit 561. $V_{rst}$ represents a reset state of a pixel cell. $V_{sig}$ represents the amount of charge generated by the photosensor in a pixel cell in response to applied light during an integration period.

The difference between $V_{sig}$ and $V_{rst}$ represents the actual pixel cell output with common-mode noise eliminated. The differential signal $(V_{rst}-V_{sig})$ is produced by differential amplifier 562 for each readout pixel cell. The differential signals are then digitized by an analog-to-digital converter 575. The analog-to-digital converter 575 supplies the digitized pixel signals to an image processor 580, which forms and outputs a digital image. The output of the analog-to-digital converter 575 is also coupled to an automatic exposure control circuit 520. The automatic exposure control circuit 520 is further coupled to analog exposure control registers 510, which are, in turn, coupled to the timing and control circuit 550. The automatic exposure control circuit 520 and the analog exposure control registers 510 perform the method 400 (FIGS. 4A-4G). The automatic exposure control circuit 520 provides an adjustment to the analog exposure control registers 510. The adjustment is the exposure adjustment factor calculated at steps 424, 427, 444, 464, 474 of method 400 (FIGS. 4B, 4D, 4F, 4G). The analog exposure control registers 510 perform steps 429, 449, 469, 479 of method 400 (FIGS. 4B, 4D, 4F, 4G), thereby generating and storing a new image exposure value. The timing and control circuit 550 controls the exposure used by the pixel array 501. The pixel array 501 receives a signal via the timing and control circuit 550 from the analog exposure control registers 510 indicating the new image exposure value, which is applied to the transistor gates of the pixels of the array to control how long the pixels accumulates charge. The image exposure value is applied to all pixels of the array if the pixel array 501 uses a global shutter and to particular rows of the array if the pixel array 501 uses a rolling shutter. The timing and control circuit 550 also controls the initialization of the automatic exposure control circuit 520 (steps 402, 404, FIG. 4A). One implementation of the automatic exposure control circuit uses a field programmable gate array (FPGA).

Figure 6:
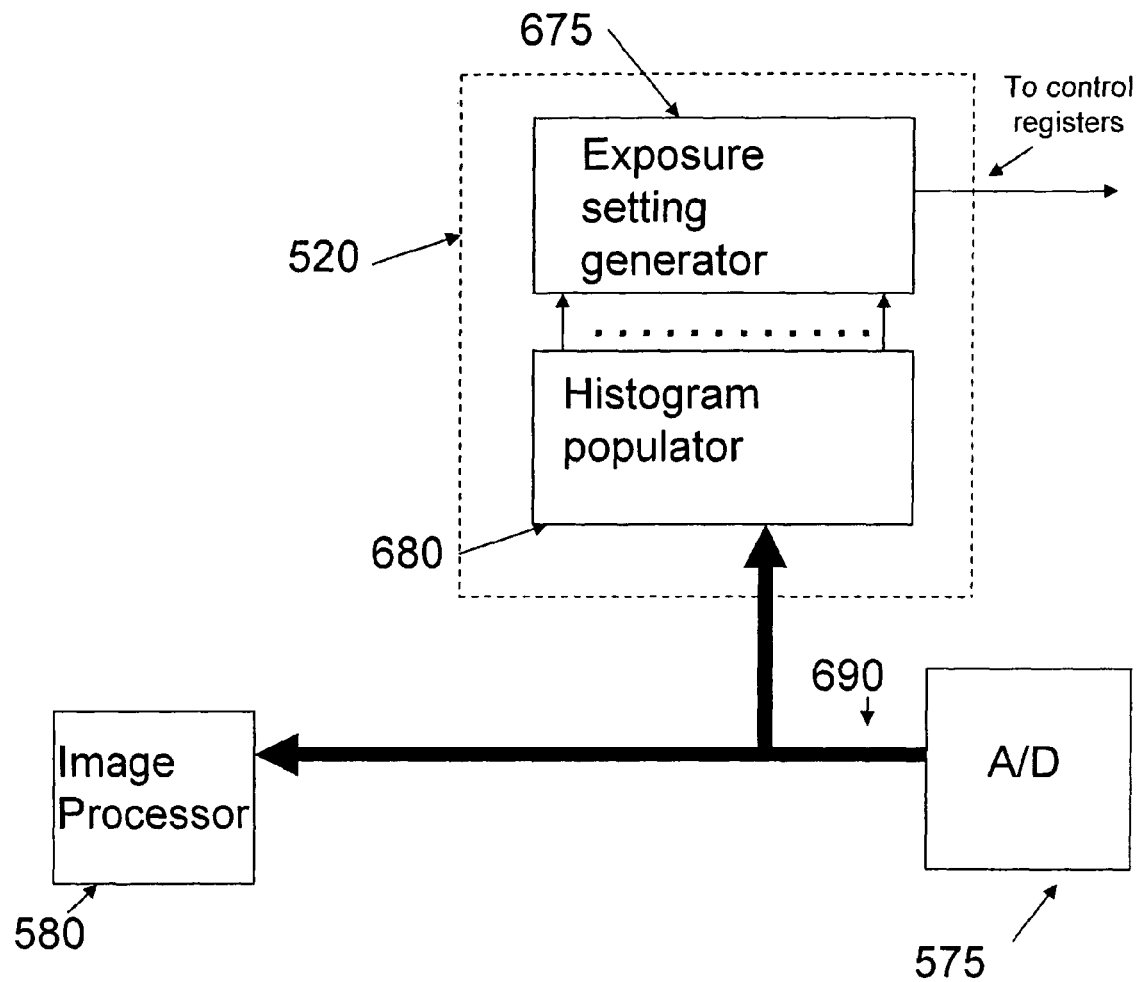
FIG. 6 is a block diagram of an automatic exposure control circuit according to an embodiment of the invention.

FIG. 6 is a block diagram of the automatic exposure control circuit 520 of FIG. 5. Digital pixel signal values are input to the automatic exposure control circuit 520 via a data stream 690 from the analog-to-digital converter 575. Digital pixel signal values are also concurrently input to the image processor 580. If the automatic exposure control circuit 520 determines that the image exposure setting is not optimal, a new image exposure setting is sent to the analog exposure control registers 510. The image is then reacquired using the new image exposure setting in the control registers 510, thus creating a new data stream that is concurrently sent to both the automatic exposure control circuit 520 and the image processor 580. In other words, the image produced by the image processor 580 generally does not concurrently reflect the results of the automatic exposure control circuit 520 (unless the image exposure is already optimized, as explained below). The data stream 690 may be progressive or interlaced depending on the image scan mode. An interlaced data stream starts with, for example, line 1 and then takes line 3 and continues in this manner until data has been obtained for the image and then goes back to take data for the even lines in this way collecting data for the entire image. A progressive data stream starts from the top at the left end and scans to the right and then starts on the next line and performs the same operation for that line until all data for an image has been collected.

The automatic exposure control circuit 520 includes a histogram populator 680 and an exposure setting generator 675. The histogram populator 680 uses the data stream 690 to populate a hierarchical histogram of 42 bins, using the previous example, 42 bins, each bin with a capacity of 768 (using a 99th percentile scheme for a QVGA image). The histogram is used in conjunction with the exposure setting generator 675 which uses method 400 to determine an adjustment for the exposure to be applied to the analog exposure control registers 510 (FIG. 5), which in turn apply the values to the transistors of pixels of the pixel array 501 (FIG. 5) to control the duration of charge accumulation.

Figure 7:
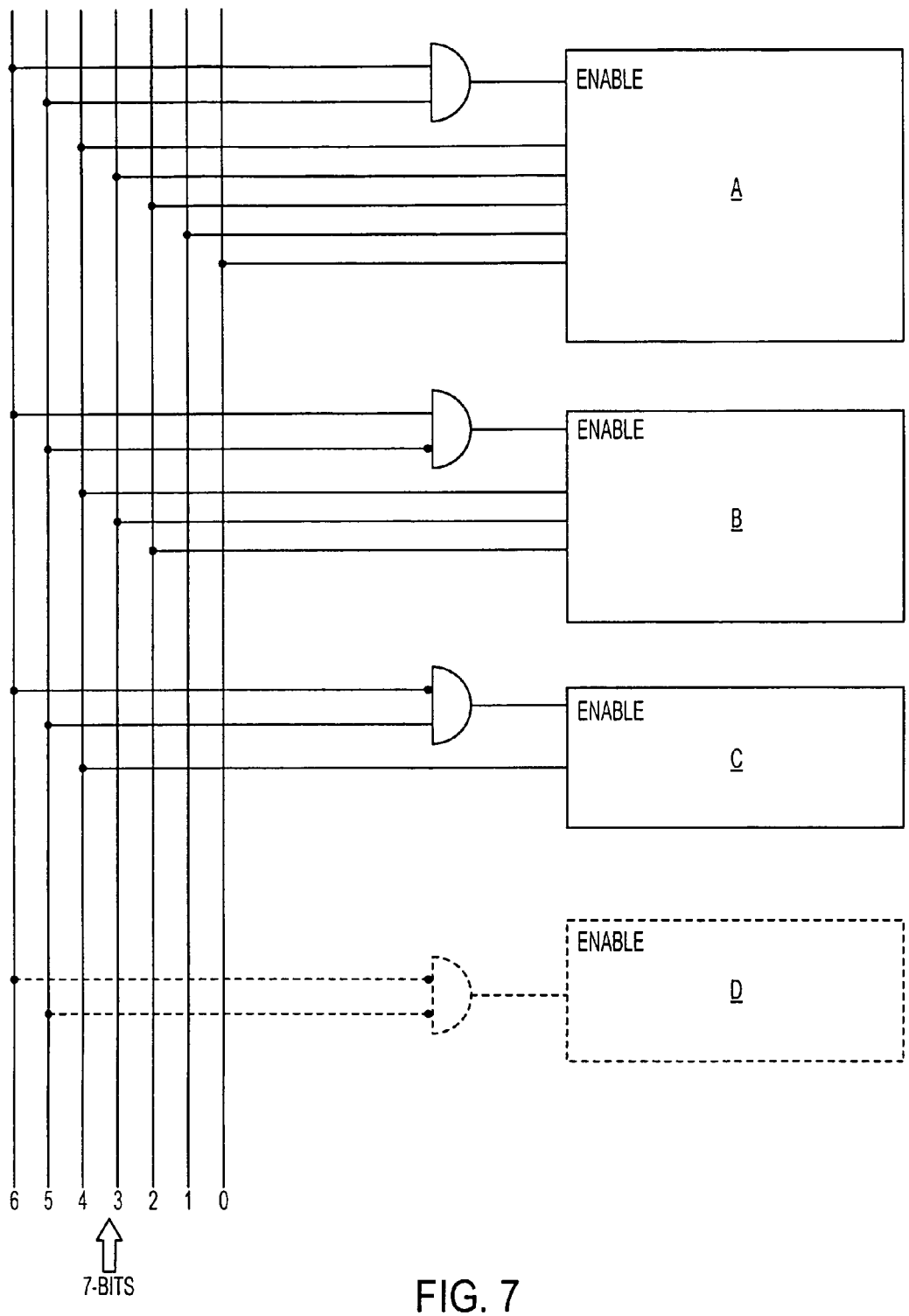
FIG. 7 is an architecture block diagram of a histogram generator according to an embodiment of the invention.

FIG. 7 is an example architecture block diagram of the histogram generator 680 of FIG. 6. In accordance with the previous example, the architecture for a 7-bit hierarchical histogram is shown. Sub-histogram A is enabled when bits b[6] and b[5] are both 1. Sub-histogram A stores the b[4] to b[0] sub-values of pixel values whose b[6] and b[5] bits are both high. Sub-histogram B is only enabled when bit b[6] is 1 and bit b[5] is 0, and then only stores the bits b[4] to b[2] sub-values. Sub-histogram C is only enabled when bit b[6] is 0 and bit b[5] is 1, and only stores the bit b[4] sub-value. Sub-histogram D need not actually be constructed in the given example. Although sub-histogram D may be enabled when bits b[6] and b[5] are both 0, sub-histogram D does not actually store any values in this embodiment of the invention.

In other embodiments, sub-histogram D could be used to store values. For example, if 'x' were to be a number greater than 8, sub-histogram D could be used to store values under the above-explained algorithm (adjusting the bin capacities and bin numbers of each sub-histogram accordingly). Furthermore, it is possible that a target bin count number may be selected that is not within the highest sub-histogram A. In this case, the algorithm is modified so that the sub-histogram in which the target bin count number is located becomes the highest-resolution sub-histogram. Sub-histograms on either side of the high-resolution sub-histogram have a coarser resolution. In all sub-histograms, the exposure adjustment factor is calculated so as to modify the image exposure setting in a way that pushes the bin count nearer the target bin count number. Finally, it should be realized that the number of sub-histograms used in the invention is not limited to a constant number. Remembering that the purpose of the sub-histograms is to reduce the hardware and processing requirements of automatic exposure control, as many or as few sub-histograms as needed may be used for any given application.

The image signal processing methods and apparatus described above may be implemented in software, hardware, firmware, application specific integrated circuits (ASICs), field programmable gate arrays (FPGAs) or any combinations of the above or their equivalent.

Figure 8:
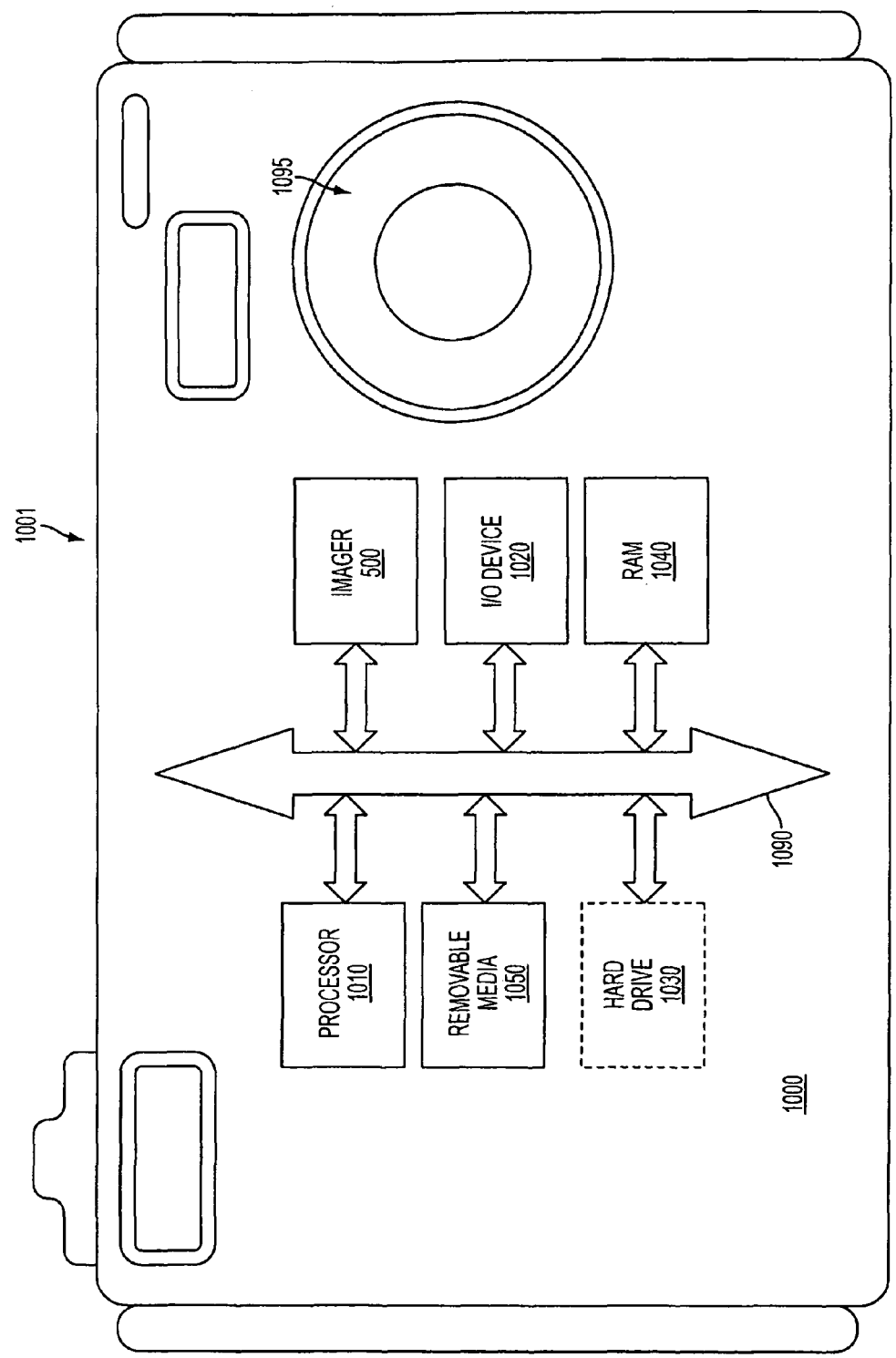
FIG. 8 is a typical processor system, for example, a digital camera processing system according to an embodiment of the invention.

The hierarchical histogram and automatic exposure control system explained above may be used in any system which employs an imager, including, but not limited to a computer system, camera system, scanner, machine vision, vehicle navigation, video phone, surveillance system, auto focus system, star tracker system, motion detection system, image stabilization system, and other imaging systems. Example digital camera systems in which the invention may be used include both still and video digital cameras, cell-phone cameras, handheld personal digital assistant (PDA) cameras, and other types of cameras. FIG. 8 shows a typical processor system 1000 which is part of a digital camera 1001. The processor system 1000 includes an imaging device 500 which includes an automatic exposure control system constructed in accordance with the embodiments described above. System 1000 generally comprises a processing unit 1010, such as a microprocessor, that communicates with an input/output (I/O) device 1020 over a bus 1090. Imaging device 500 also communicates with the processing unit 1010 over the bus 1090. The processor system 1000 also includes random access memory (RAM) 1040, and can include removable media 1050, such as flash memory, which also communicates with the processing unit 1010 over the bus 1090. Lens 1095 focuses an image on a pixel array of the imaging device 500.

The processor system 1000 could alternatively be part of a larger processing system, such as a computer. Through the bus 1090, the processor system 1000 illustratively communicates with other computer components, including but not limited to, a hard drive 1030 and one or more removable media devices 1050. The imaging device 500 may be combined with a processor, such as a central processing unit, digital signal processor, or microprocessor, with or without memory storage on a single integrated circuit or on a different chip than the processor.

It should again be noted that although the embodiments have been described with specific reference to CMOS imaging devices, they have broader applicability and may be used in any imaging apparatus which generates pixel output values from a pixel array. The above description and drawings illustrate preferred embodiments.

What is claimed as new and desired to be protected by Letters Patent of the United States is:

1. An automatic exposure control circuit, comprising:
    a hierarchical histogram generator for generating a plurality of histograms of differing resolutions for an image, each histogram comprising a different number of at least one bin, each bin representing a number of pixels in the image having a pixel value within a respective unique range of pixel values for the image, each histogram also corresponding to a unique range of pixel values for the image; and
    an image exposure adjustment module for adjusting an image exposure setting for the image according to a distribution of pixel values determined from the plurality of histograms.

2. The automatic exposure control circuit of claim 1, wherein the image exposure adjustment module is configured to determine a target bin within one of the plurality of histograms such that an optimal image exposure setting results in a pre-determined percentage of pixel values being distributed within the at least one bin corresponding to pixel values that are higher than or equal to the unique range of pixel values represented by the target bin.

3. The automatic exposure control circuit of claim 2, wherein the image exposure adjustment module is configured to locate an actual bin at which the pre-determined percentage of pixel values is distributed within the plurality of bins corresponding to pixel values that are higher than or equal to the unique range of pixel values represented by the actual bin.

4. The automatic exposure control circuit of claim 3, wherein the image exposure adjustment module is configured to determine a new image exposure setting that results in the actual bin being closer to the target bin within the plurality of histograms if the actual bin and the target bin are not within a predetermined number of bins of each other.

5. The automatic exposure control circuit of claim 4, wherein the image exposure adjustment module is configured to adjust the image exposure setting differently according to which histogram the actual bin is located.

6. The automatic exposure control circuit of claim 2, wherein the image exposure adjustment module is configured to locate the target bin within a histogram with the highest resolution of the plurality of histograms.

7. The automatic exposure control circuit of claim 1, wherein the plurality of histograms is arranged such that a histogram covering the highest range of pixel values has a highest resolution and histograms representing pixel value ranges that are lower than the highest range of pixel values have lower resolutions.

8. The automatic exposure control circuit of claim 7, wherein the image exposure adjustment module is configured to determine a target bin within the histogram with the highest resolution such that an optimal image exposure setting results in a pre-determined percentage of pixel values being distributed within the bins corresponding to pixel values that are higher than or equal to the unique range of pixel values represented by the target bin.

9. The automatic exposure control circuit of claim 8, wherein the image exposure adjustment module is configured to locate an actual bin at which the pre-determined percentage of pixel values is distributed within the bins corresponding to pixel values that are higher than or equal to the unique range of pixel values represented by the actual bin.

10. The automatic exposure control circuit of claim 9, wherein the image exposure adjustment module is configured to determine a new image exposure setting that results in a shorter image exposure if the actual bin is higher than the target bin, and a longer image exposure if the actual bin is lower than the target bin.

11. The automatic exposure control circuit of claim 9, wherein the image exposure adjustment module is configured to determine a new image exposure setting using an image exposure adjustment factor with a resolution equal to the resolution of the histogram in which the actual bin is located if the actual bin and the target bin are not within a predetermined number of bins of each other.

12. An automatic exposure control feedback apparatus, comprising:
    a pixel array;
    an automatic exposure control circuit, comprising:
        a hierarchical histogram generator for generating a plurality of histograms of differing resolutions for an image, each histogram comprising a different number of at least one bin, the at least one bin representing a unique range of pixel values for the image; and
        an image exposure adjustment module for adjusting an image exposure setting for the image according to a distribution of pixel values determined from the plurality of histograms; and
    a register circuit for modifying the image exposure setting of the pixel array according to the image exposure setting output by the automatic exposure control circuit.

13. A hierarchical histogram generator for exposure control, comprising:
    a plurality of sub-histogram modules for use with an image, each with an enable input and a plurality of pixel value bit-line inputs, each sub-histogram module having a different number of pixel value bit-line inputs; and an exposure control module for determining an image exposure adjustment setting for the image based on a distribution of pixel values in the plurality of sub-histogram modules.

14. The hierarchical histogram generator of claim 13, wherein each sub-histogram is enabled using a number of bit-lines representing the most significant bits of the pixel values, the number being the smallest number required to individually select each sub-histogram.

15. The hierarchical histogram generator of claim 14, wherein the sub-histogram enabled by the highest valued bit-lines has the greatest number of pixel value bit-line inputs and the sub-histogram enabled by the lowest valued bit-lines has the fewest number of pixel value bit-line inputs.

16. The hierarchical histogram generator of claim 13, wherein at least one of the plurality of sub-histogram modules is enabled by a condition selected from the group of: when the two most significant bits of a seven-bit pixel value are both high, when the most significant bit of a seven-bit pixel value is high and the second most significant bit of a seven-bit pixel value is low, when the most significant bit of a seven-bit pixel value is low and the second most significant bit of a seven-bit pixel value is high, and when the two most significant bits of a seven-bit pixel value are both low.

17. A method for generating a hierarchical histogram for exposure control, comprising:
    generating a plurality of histograms of differing resolutions for an image, each histogram comprising a different number of at least one bin with each bin corresponding to a unique range of pixel values for the image, each histogram also corresponding to a unique range of pixel values for the image; and
    determining an image exposure adjustment setting for the image based on a distribution of pixel values in the plurality of histograms.

18. The method of claim 17, further comprising designating each histogram by a unique binary word, the binary word representing a number of the most significant bits of the pixel values, the number of most significant bits being the smallest number required to uniquely identify each histogram.

19. The method of claim 18, wherein the histogram designated by the highest valued binary word has the highest resolution and the histogram designated by the lowest valued binary word has the lowest resolution.

20. The method of claim 17, further comprising populating at least one of the plurality of histograms with a procedure selected from the group of: using seven-bit pixel values whose two most significant bits are both high, using seven-bit pixel values whose first most significant bit is high and whose second most significant bit is low, using seven-bit pixel values whose first most significant bit is low and whose second most significant bit is high, and using seven-bit pixel values whose two most significant bits are both low.

21. The method of claim 20, wherein a predetermined number of bits of the seven-bit pixel values are used to populate the at least one of the plurality of histograms, the predetermined number of bits being less than seven.

22. A method for automatically adjusting an image exposure setting, comprising:
    acquiring a plurality of pixel values representing an image using a first image exposure setting;
    populating a hierarchical histogram using the pixel values, wherein the hierarchical histogram is comprised of a plurality of sub-histograms of differing resolutions, each sub-histogram comprised of a different number of at least one bin with each bin corresponding to a unique range of pixel values for the image;
    determining a target bin within one of the sub-histograms, the target bin determined such that an optimal image exposure setting results in a pre-determined percentage of pixel values being distributed within the bins corresponding to pixel values that are higher than or equal to the unique range of pixel values represented by the target bin;
    locating an actual bin at which the pre-determined percentage of pixel values is distributed within the bins corresponding to pixel values that are higher than or equal to the unique range of pixel values represented by the actual bin; and
    determining a second image exposure setting that results in the actual bin being closer to the target bin if the actual bin and the target bin are not within a predetermined range of each other.

23. The method of claim 22, wherein the sub-histograms are arranged such that a sub-histogram covering the highest range of pixel values has a highest resolution and sub-histograms representing pixel value ranges that are lower than the highest range of pixel values have lower resolutions.

24. The method of claim 22, wherein if the actual bin is higher than the target bin, the image exposure adjustment module determines a new image exposure setting that results in a shorter image exposure, and if the actual bin is lower than the target bin, the image exposure adjustment module determines a new image exposure setting that results in a longer image exposure.

25. The method of claim 22, wherein the second image exposure setting is determined using an image exposure adjustment factor with a resolution equal to the resolution of the sub-histogram in which the actual bin is located.

* * * * *